(12) United States Patent
Nakamura

(10) Patent No.: US 6,201,963 B1
(45) Date of Patent: Mar. 13, 2001

(54) MOBILE COMMUNICATION SYSTEM

(75) Inventor: Naoyuki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/057,959

(22) Filed: Apr. 9, 1998

(30) Foreign Application Priority Data

Apr. 11, 1997 (JP) .................................................. 9-093464

(51) Int. Cl.[7] .................................................. H04Q 7/20
(52) U.S. Cl. ........................ 455/432; 455/435; 455/428; 455/552
(58) Field of Search .................................. 455/432, 435, 455/421, 551, 552, 566, 553, 428

(56) References Cited

U.S. PATENT DOCUMENTS

| | | | |
|---|---|---|---|
| 4,700,374 | * 10/1987 | Bini | 379/60 |
| 5,258,964 | * 11/1993 | Koma et al. | 369/47 |
| 5,375,104 | * 12/1994 | Ishii et al. | 368/22 |
| 5,564,077 | * 10/1996 | Obayashi et al. | 455/89 |
| 5,615,248 | * 3/1997 | Noritmatsu | 379/58 |
| 5,956,640 | * 9/1999 | Eaton et al. | 455/432 |

FOREIGN PATENT DOCUMENTS

| | | |
|---|---|---|
| 0 731 621 A2 | 9/1996 | (EP) . |
| 0731621 A2 | * 11/1996 | (EP) . |
| 2 292 047 | 2/1961 | (GB) . |
| 4-119020 | 4/1992 | (JP) . |
| 5-14271 | 1/1993 | (JP) . |
| 5-63640 | 3/1993 | (JP) . |
| 5-207111 | 8/1993 | (JP) . |
| 5-336035 | 12/1993 | (JP) . |
| 6-13977 | 1/1994 | (JP) . |
| 6-69882 | 3/1994 | (JP) . |
| 6-232800 | 8/1994 | (JP) . |
| 7-79194 | 3/1995 | (JP) . |
| 8-256368 | 10/1996 | (JP) . |
| 10-160870 | 6/1998 | (JP) . |

* cited by examiner

*Primary Examiner*—Fan Tsang
*Assistant Examiner*—Marceau Milord
(74) *Attorney, Agent, or Firm*—Scully, Scott, Murphy & Presser

(57) ABSTRACT

When a mobile station enters into a service area of a non-subscriber communication system and uses it with a roaming service, the mobile station receives system information from a repeater station of the communication system, recognizes user interface information included in the system information, and switches the user interface of the subscriber communication system to a user interface of the non-subscriber communication system corresponding to the recognized user interface information. Thus, the mobile station can effectively use the roaming service and thereby conveniently use the mobile communication system.

3 Claims, 4 Drawing Sheets

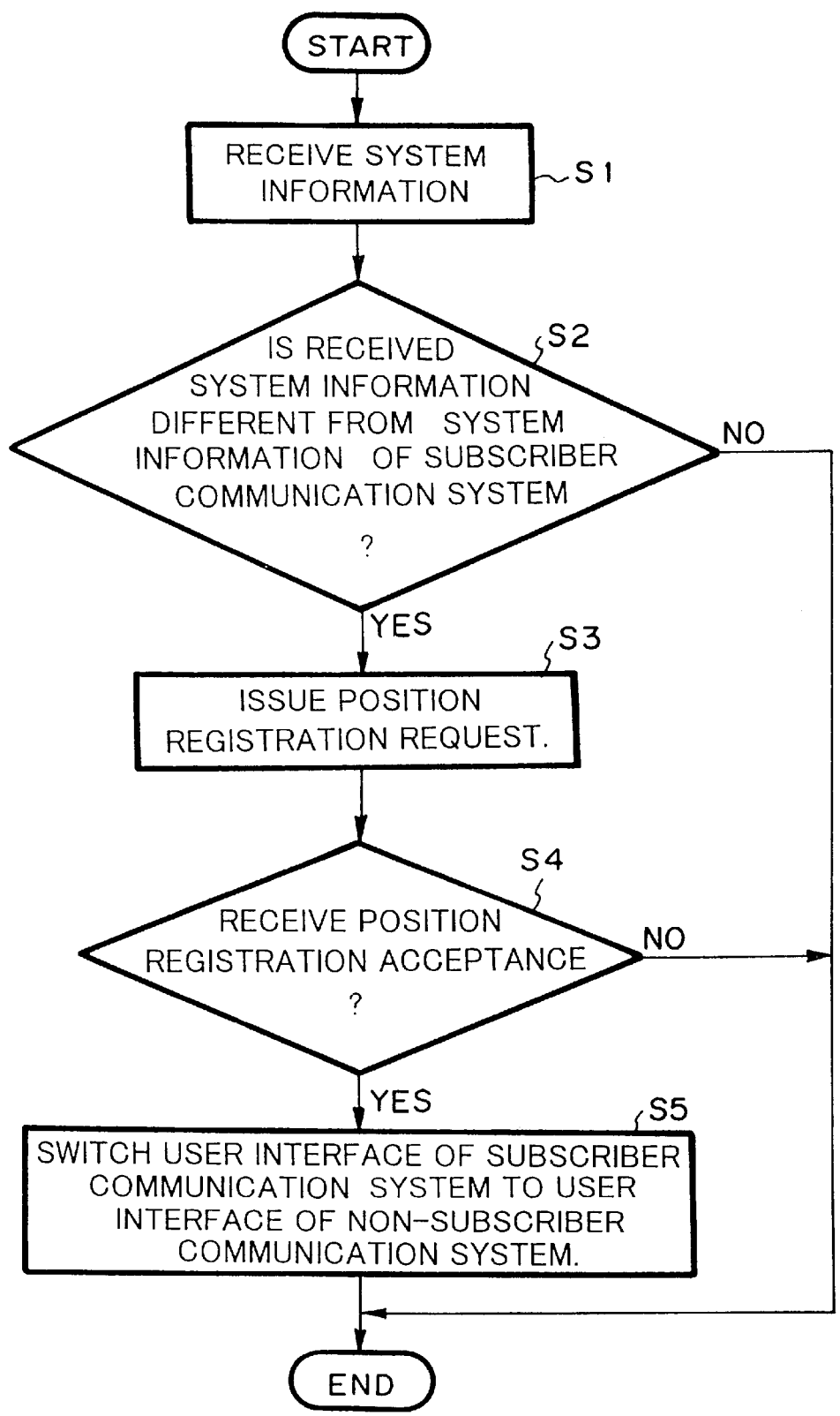

MOBILE COMMUNICATION SYSTEM

BACKGROUND OF THE INVENTION

1. Field of the Invention

The present invention relates to a mobile communication system that allows a land mobile station to communicate using a roaming service through a different communication system of each of communication companies in an area into which the land mobile station enters, in particular, to a mobile communication system that allows the land mobile station to adaptively use user interfaces of individual communication companies.

2. Description of the Related Art

In a conventional mobile communication system, particularly, in a radiotelephone system of which a land mobile station communicates through a repeater station, there are many communication systems provided by communication companies. Normally, a land mobile station issues a position registration request to a repeater station of a communication system of a communication company to which the land mobile station subscribes. Hereinafter, a communication company to which a land mobile station subscriber is referred to as subscriber communication company. The communication system of the subscriber communication company is referred to as subscriber communication system. The other communication companies are referred to as non-subscriber communication companies. The communication system of a non-subscriber communication company is referred to as non-subscriber communication system. When the mobile station exits from the service area of the communication system of the subscriber communication company and enters into a service area of a communication system of a non-subscriber communication company, the mobile station issues a position registration request to a repeater station of the communication system of the non-subscriber communication company. Thus, the land mobile station can communicate using the communication system of the non-subscriber communication company. The service that a land mobile station communicate using a communication system of a non-subscriber communication company is referred to as roaming service. At this point, the user of the land mobile station can identify a service area of a communication company of a non-subscriber communication company with system information that the land mobile station receives.

Thus, in a mobile communication system having the roaming service, even if a land mobile station enters into a service area of a communication system of a non-subscriber communication company, the land mobile station can communicate using the communication system of the non-subscriber communication company. However, if communication systems of individual communication companies have unique user interfaces, the mobile station cannot flexibly handle these user interfaces. Thus, in the situation that a land mobile station can use a service of a communication system of a non-subscriber communication company using the roaming service, the land mobile station cannot effectively use the service of the communication system. For example, in the case that a mobile station that subscribes to a communication system of a domestic communication company (for example, in Japan) is used in a foreign country, even if the land mobile station can cause a communication system of a non-subscriber communication company in the foreign country, when the user interface of the land mobile station cannot handle the foreign language (namely, the land mobile station cannot display messages and time in the foreign language), the user of the land mobile station cannot effectively use the roaming service of the communication system of the foreign country. The interface information of the present invention includes information such as country code and geographic information such as Long. 35° E. and Lat. 35° N. and information of communication systems such as W-CDMA and TD-CDMA.

SUMMARY OF THE INVENTION

An object of the present invention is to provide a mobile communication system that allows a mobile station to effectively have a roaming service in a service area of a communication system of a non-subscriber communication company that has a different user interface from that of a communication system of a subscriber communication company.

The present invention is a mobile communication system for allowing a mobile station to use communication systems of non-subscriber communication companies in their service areas into which the mobile station enters using roaming services, wherein the mobile station recognizes user interface information of a communication system of a non-subscriber communication company in its service area into which the mobile station enters and switches a user interface of a communication system of a subscriber communication company to a user interface corresponding to the communication system of the non-subscriber communication company.

The mobile station comprises a storing means for storing data of a plurality of user interfaces, a recognizing means for recognizing user interface information included in system information received from a repeater station of the non-subscriber communication company, and a switching means for reading data of the relevant user interface from the storing means corresponding to the recognized user interface information and setting the data of the user interface to an interface portion of the mobile station.

The mobile communication system further comprises a comparing means for comparing the difference between system information of the communication system of the non-subscriber communication company and system information of the communication system of the subscriber communication system, a position registration requesting means for issuing a position registration request to the communication system of the non-subscriber communication system when the system information of the communication system of the non-subscriber communication system is different from the system information of the communication system of the subscriber communication system, and a determining means for determining whether or not the communication system of the non-subscriber communication company has accepted the position registration request, wherein the recognizing means recognizes the user interface information when the communication system of the non-subscriber communication company has accepted the position registration request.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a flow chart for explaining a switching operation of a user interface in the operation shown in FIG. 3.

DESCRIPTION OF PREFERRED EMBODIMENTS

Figure 1:
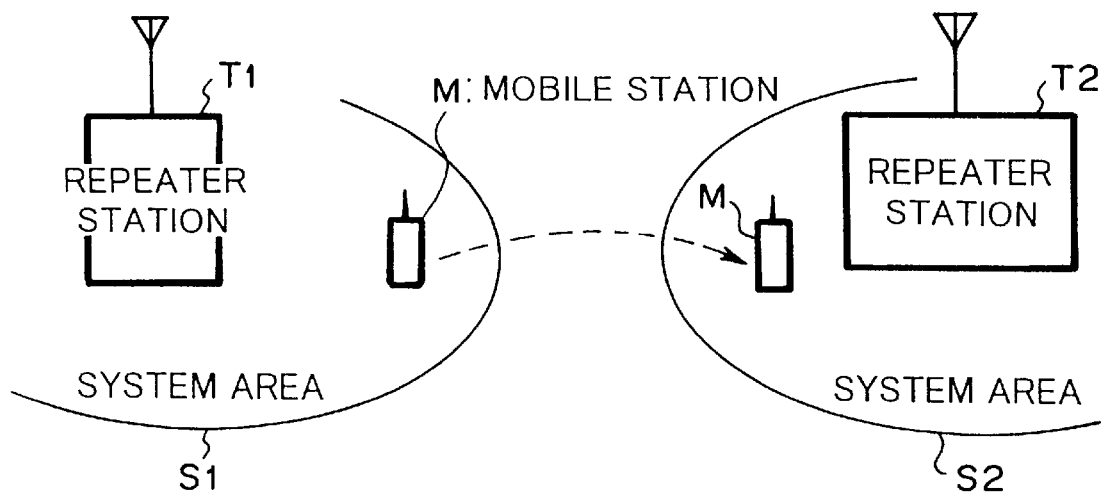
FIG. 1 is a schematic diagram showing the concept of a mobile communication system according to the present invention.

Next, with reference to the accompanying drawings, an embodiment of the present invention will be described. FIG. 1 is a schematic diagram showing the concept of a mobile communication system according to the present invention. FIG. 1 shows a situation that a mobile station that subscribes to a communication system of a communication company in Japan is used in a communication system in a foreign country using a roaming service. In FIG. 1, M is a mobile station; S1 and S2 are system areas (service areas) of communication systems of individual communication companies; and T1 and T2 are repeater stations of the system areas S1 and S2, respectively.

Figure 2:
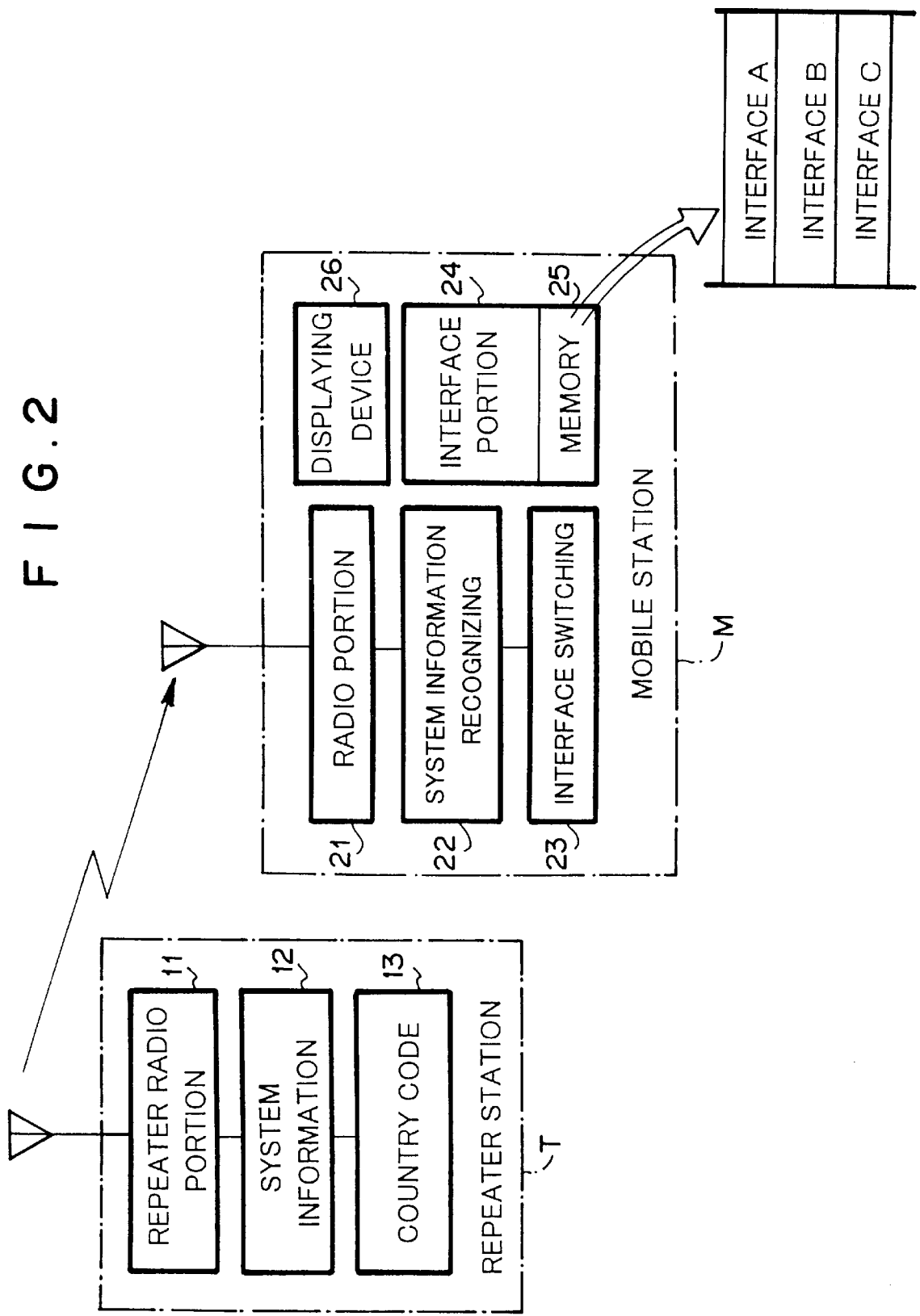
FIG. 2 is a block diagram showing the structure of principal portions of a mobile station and a repeater station according to the present invention.

FIG. 2 is a block diagram showing the structure of principal portions of the mobile station M and the repeater stations T1 and T2. In the repeater station T (T1 or T2), a system information portion 12 superimposes system information of the communication system of the communication company with an information signal transmitted from a repeater radio portion 11. The system information includes user interface information (for example, a country code 13) of the communication system of the communication company. In the mobile station M, a system information recognizing portion 22 recognizes system information with a signal received by a radio portion 21 that communicates with the repeater station T and detects the user interface information (namely, the country code) with the system information. Corresponding to the detected result, an interface switching portion 23 switches a user interface. The switching operation of the interface switching portion 23 is performed in the following manner. A memory 25 of the interface portion 24 has stored data of user interfaces corresponding to communication systems of domestic and foreign communication companies. The user interface portion 24 reads data of a user interface corresponding to the user interface information recognized by the system information recognizing portion 22 and sets the data of the user interface to the user interface portion 24. In addition, the data of the user interface is displayed on a displaying device 26.

Figure 3:
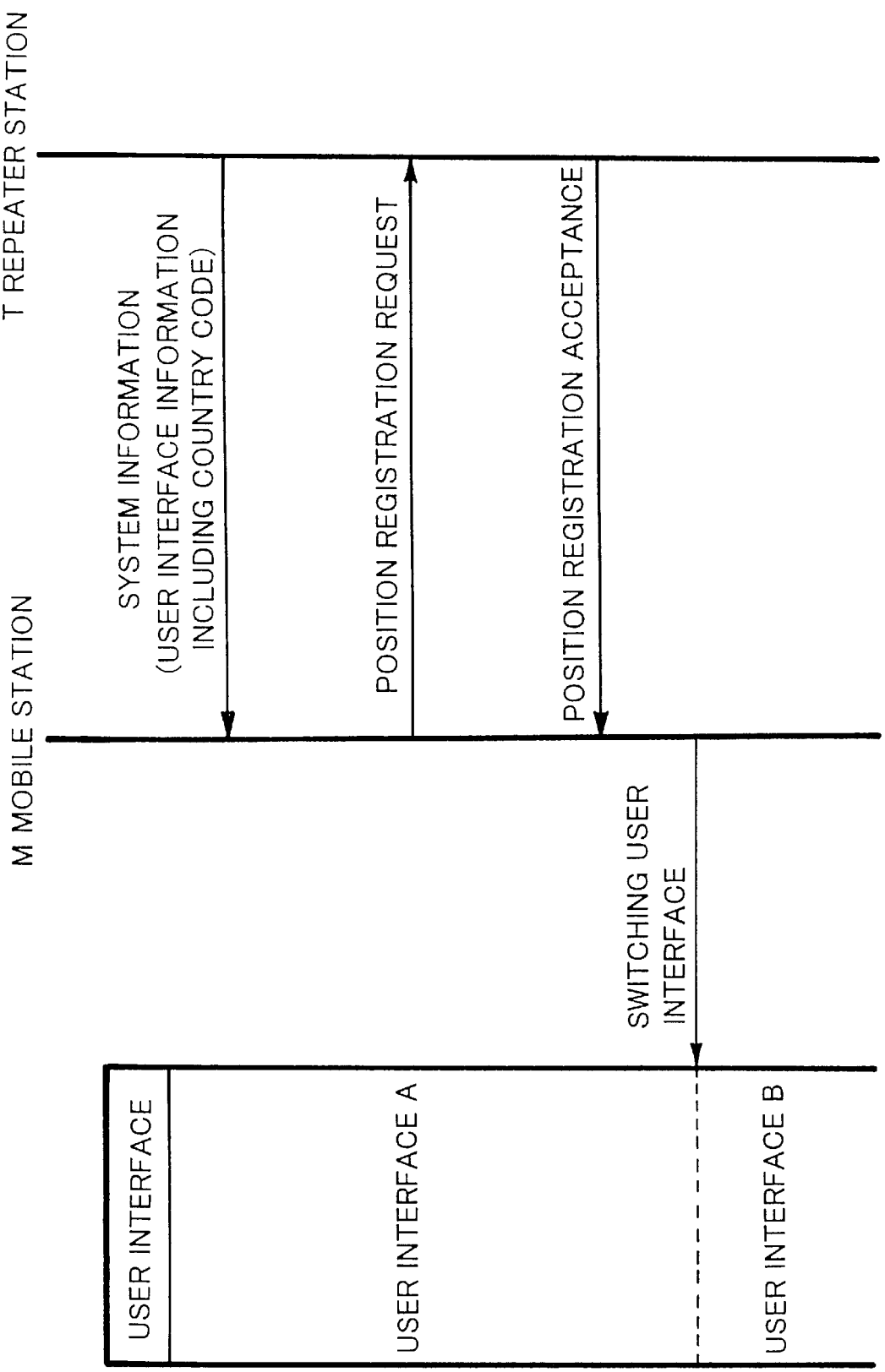
FIG. 3 is a timing chart for explaining an example of the operation of the present invention.

Next, with reference to a timing chart shown in FIG. 3 and a flow chart shown in FIG. 4, the operation of the mobile communication system will be descried. In FIG. 3, when the mobile station M exits from the service area of the subscriber communication system and enters into a service area of a foreign non-subscriber communication system, the mobile station M receives system information from the repeater station T of the foreign non-subscriber communication system. When the mobile station M receives a position registration acceptance from the repeater station T corresponding to the position registration request, the roaming process is completed. Thus, the mobile station M can use the non-subscriber communication system. At this point, if the mobile station M operates with the user interface of the subscriber communication system, the mobile station T switches the current user interface to a user interface corresponding to the user interface information included in the system information received from the repeater station T and sets data of the new user interface to the interface portion. Thereafter, the mobile station M can communicate using the user interface of the non-subscriber communication system.

Next, with reference to FIG. 4, the switching process of the user interface will be described. When the mobile station enters into the service area of a non-subscriber communication system, the mobile station receives system information of the non-subscriber communication system (at step S1). The mobile station determines whether or not the received system information is different from the system information that has been set therein (at step S2). When the determined result at step S2 is No, the mobile station completes the process. When the determined result at step S2 is Yes, the mobile station issues a position registration request to the repeater station of the non-subscriber communication system (at step S3). When the mobile station receives a position registration acceptance from the repeater station and thereby the position registering process is completed (at step S4), the mobile station recognizes user interface information included in the system information received at step S1. The mobile station searches a memory address of data of a user interface corresponding to the recognized user interface information, reads data from the memory address, and sets the data of the user interface to the interface portion. Thus, the mobile station switches the user interface of the subscriber communication system to the user interface of the non-subscriber communication system (at step S5). When the determined result at step S4 is No, the mobile station terminates the process.

Figure 5A:
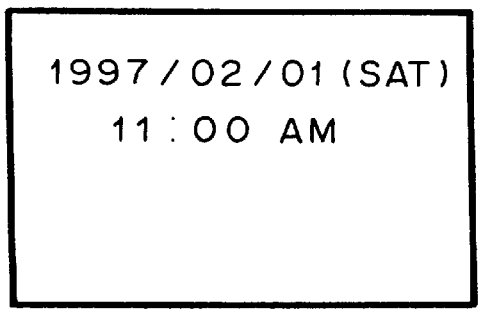
FIGS. 5A and 5B are schematic diagrams showing examples of date and time displayed corresponding to user interfaces switched by a mobile station.
Figure 5B:
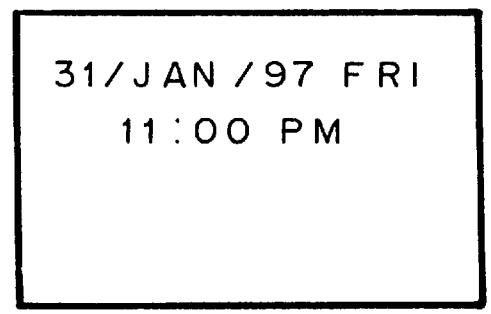

FIGS. 5A and 5B are schematic diagrams showing examples of date and time displayed corresponding to user interfaces switched by a mobile station. FIG. 5A shows a date and time displayed in Japanese corresponding to a user interface of the mobile station used in Japan. FIG. 5B shows date and time displayed in English corresponding to a user interface of the mobile station used in a foreign country. When the mobile station switches the user interface of the subscriber communication system to the user interface of the non-subscriber communication system, the interface portion calculates the time difference between the subscriber communication system and the non-subscriber communication system using country code of the user interface information and updates the time. In this example, it is assumed that the time difference between the subscriber communication system and the non-subscriber communication system is 12 hours. Thus, the mobile station updates date and time corresponding to the user interface information of the non-subscriber communication system It should be noted that the above-described embodiment is just an example of the present invention. In Japan, the mobile station may display messages in Japanese. In foreign countries, the mobile station may display messages in English. In addition, the mobile station may display time corresponding to a daylight saving time system. In the above-described embodiment, the mobile station is used in Japan and a foreign country. However, when the mobile station has roaming services of various communication systems, the mobile station may switch user interfaces corresponding to the communication systems so as to effectively use the communication systems.

As described above, according to the present invention, the mobile station recognizes user interface information with system information of a communication system in a service area into which the mobile station enters and switches the user interface of the subscriber communication system to a user interface of the non-subscriber communication system.

Thus, the mobile station can effectively use a service of a non-subscriber communication system using a roaming service. Consequently, the mobile station can conveniently use the mobile communication system.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile communication system for allowing a mobile station to use communication systems of non-subscriber communication companies in their service areas into which the mobile station enters using roaming services, wherein the mobile station includes: recognizing means for recognizing user interface information of a communication system of a non-subscriber communication company in its service area into which the mobile station enters and communicates bi-directionally, and switching means for switching, after the roaming process is completed, a user interface of a communication system of a subscriber communication company to a user interface corresponding to the communication system of the non-subscriber communication company, wherein a roaming process of said mobile station is completed after said mobile station receives position registration acceptance from a communication system, and wherein said mobile station completes said roaming process of said roaming services, said mobile station utilizes its switching means to switch the user interface of a communication system of a subscriber communication company to a user interface corresponding to the communication system of the non-subscriber communication company.

2. A mobile communication system, comprising:

a mobile station for moving between different communication systems and implementing roaming services, wherein each said different communication systems are constructed to bi-directionally communicate with said mobile station to enable said communication systems and said mobile station to implement a roaming process of said roaming services; and wherein said mobile station comprises:

a system information recognizing portion for recognizing system information within a signal received from a base station of said different communication systems and detecting a user interface corresponding to said base station by using the system information;

a memory for storing a plurality of user interfaces corresponding to communication systems of foreign and domestic communication companies;

a user interface portion for reading data of the user interface corresponding to the user interface information recognized by the system information recognizing portion and setting the data of the user interface to said user interface portion; and a displaying device for displaying data of the user interface;

wherein the roaming process of said mobile station is completed after said mobile station receives position registration acceptance from a communication system, and wherein after said mobile station completes said roaming process of said roaming services, said mobile station switches the user interface of a communication system of the subscriber communication company to the user interface corresponding to the communication system of the non-subscriber communication company.

3. The mobile communication system as set forth in claim 2, wherein when the communication system of the non-subscriber communication company within which said mobile station completes its roaming process is a communication system of a foreign communication company, and the user interface thereof allows messages and date and time to be displayed in a language of the country of the foreign communication company.

* * * * *

UNITED STATES PATENT AND TRADEMARK OFFICE
CERTIFICATE OF CORRECTION

PATENT NO.    : 6,201,963 B1
DATED         : March 13, 2001
INVENTOR(S)   : N. Nakamura It is certified that error appears in the above-identified patent and that said Letters Patent is hereby corrected as shown below:

<u>Title page,</u>
Item [56], References Cited, U.S. PATENT DOCUMENTS, insert -- 5,196,842 3/1993  Gomez, et al. -- and delete "0731621 A2 * 11/1996 (EP)"

Signed and Sealed this

Eighteenth Day of June, 2002

Attest:

Attesting Officer

JAMES E. ROGAN
*Director of the United States Patent and Trademark Office*